United States Patent [19]

Glover et al.

[11] Patent Number: 5,634,609

[45] Date of Patent: Jun. 3, 1997

[54] RELEASABLE ATTACHMENT FOR CONNECTING A FILM STRIP TO A FILM CASSETTE SPOOL

[75] Inventors: Edward C. Glover, London; Anthony Earle, Middlesex, both of England

[73] Assignee: Eastman Kodak Company, Rochester, N.Y.

[21] Appl. No.: 517,521

[22] Filed: Aug. 21, 1995

[30] Foreign Application Priority Data

Aug. 24, 1994 [GB] United Kingdom ............... 94017070

[51] Int. Cl.$^6$ .................................................. B65H 75/28
[52] U.S. Cl. ...................................... 242/584.1; 242/348.1
[58] Field of Search ........................... 242/348, 348.1, 242/348.3, 584.1; 354/275

[56] References Cited

U.S. PATENT DOCUMENTS

| | | |
|---|---|---|
| 2,487,479 | 11/1949 | Roehrl .................. 242/348.1 |
| 3,586,258 | 6/1971 | Horlezeder . |
| 3,650,389 | 3/1972 | Mook . |
| 3,705,696 | 12/1972 | Edwards . |
| 4,334,750 | 6/1982 | Fichter . |
| 4,338,015 | 7/1982 | Holmes . |
| 4,808,229 | 2/1989 | Arhelger . |
| 4,834,310 | 5/1989 | Ikariya et al. . |
| 4,955,555 | 9/1990 | Pierson et al. . |
| 5,054,710 | 10/1991 | Ikariya et al. . |

FOREIGN PATENT DOCUMENTS

| | | | |
|---|---|---|---|
| 485957 | 5/1992 | European Pat. Off. . | |
| 1697046 A2 | 12/1991 | U.S.S.R. ................. | 242/348 |
| 632526 | 11/1949 | United Kingdom ........ | 242/348.1 |
| 737378 | 9/1955 | United Kingdom ........ | 242/584.1 |

*Primary Examiner*—John P. Darling
*Attorney, Agent, or Firm*—Clyde E. Bailey, Sr.

[57] ABSTRACT

Film cassettes normally include a spool on to which a film strip is wound. However, the film strip is normally fixed to the spool and needs to be severed therefrom prior to processing. A releasable attachment connects a film strip (50) to a spool (30). The spool (30) comprises an outer portion (32) and an inner portion (34) which is rotatable relative to the outer portion (32). The outer portion (32) has a slot (38) formed therein into which the film strip (50) is inserted. The inner portion (34) carries a tongue member (42) which engages an aperture (54) formed in the film strip (50) as the inner portion (34) is rotated relative to the outer portion (32) about an axis (36). The film strip (50) is released by rotating the inner portion (34) in the reverse direction.

3 Claims, 2 Drawing Sheets

5,634,609

RELEASABLE ATTACHMENT FOR CONNECTING A FILM STRIP TO A FILM CASSETTE SPOOL

FIELD OF THE INVENTION

The present invention relates to a releasable attachment for connecting a film strip to a film cassette spool, and is particularly concerned with such an attachment which allows for repeated use of the film cassette spool.

BACKGROUND OF THE INVENTION

It is well known to rotatably support a film strip on a spool within a film cassette. In some such arrangements, the end of the film strip adjacent the spool is not secured thereto and there is a risk that the film strip will inadvertently become detached from the spool and hence be wholly withdrawn from the cassette during its exposure. One such arrangement is described in U.S. Pat. No. 4 145 133.

There are other arrangements which overcome this problem by attaching the trailing end of the film strip to the spool. These arrangements prevent the film strip being fully extracted from the cassette during exposure, but necessitate the use of a cutter to detach the film strip from the spool prior to processing.

U.S. Pat. No. 5 054 710 discloses a spool for a camera on to which a film strip is to be wound during exposure. The spool includes a shaft having a slit formed therein. A protrusion is located in the slit to engage a perforation in the leading edge of the film strip, the film strip being wound on to the spool as it is exposed in the camera. When the film strip is fully exposed, it is unwound from this spool back into its cassette. The leading edge of the film strip slips out of the slit as the wall of the perforation engaging the protrusion slides down an angled wall thereof to release the film strip from the spool.

U.S. Pat. No. 4 334 750 discloses an arrangement for a spool in a film cassette which allows the trailing end of the film strip to be released. The arrangement comprises a hollow spool having a slot formed in its wall. A retaining member is located within the hollow spool and carries a protrusion for engaging a perforation in the trailing end of the film strip to retain it in the slot. When it is desired to release the film strip from the spool, the retaining member is pushed inwardly with respect to the spool so that the protrusion is forced out of the slot thereby releasing the perforation and the trailing end. Once pushed in, the retaining member cannot be withdrawn from the spool.

PROBLEM TO BE SOLVED BY THE INVENTION

In arrangements for permanently attaching the film strip to the spool, it is necessary to cut the film strip to detach it from the spool so that it can be processed. This means that a small piece of film strip remains attached to the spool which then has to be removed by hand prior to the spool being re-used. Although the arrangement described in U.S. Pat. No. 4 334 750 allows the film strip to be detached from the spool without having to sever it therefrom, the spool is complex and cannot be re-used.

SUMMARY OF THE INVENTION

It is therefore an object of the present invention to provide a releasable attachment for connecting a film strip to a film cassette spool which overcomes the problems mentioned above.

In accordance with one aspect of the present invention, there is provided a film cassette spool comprising:

a body portion having a slot formed therein for receiving a film strip; and attachment means located in the slot for attaching the film strip to the spool;

characterized in that the body portion includes an inner body portion carrying the attachment means, the inner body portion being rotatable relative to the body portion between a first position in which the attachment means is not in engagement with the film strip and a second position in which the attachment means engages the film strip.

Advantageously, the attachment means comprises a tongue portion which extends across the slot when in the second position. The tongue portion is formed at an edge of a slot formed in the inner body portion, slot being substantially larger than slot slot formed in the body portion.

In accordance with another aspect of the present invention, there is provided a method of releasably attaching a film strip to a film cassette spool as described above, characterized in that the method comprises the steps of:

a) inserting the film strip into the slot formed in the body portion of the cassette spool;

b) rotating the inner body portion relative to the body portion so that the attachment means engages the film strip; and c) reversing the direction of rotation of the inner body portion relative to the body portion to release the film strip.

ADVANTAGEOUS EFFECT OF THE INVENTION

By this arrangement, a simple releasable attachment is provided for attaching a film strip to a spool. There is no need to sever the film strip to remove it from the spool and the spool is re-usable.

BRIEF DESCRIPTION OF THE DRAWINGS

For a better understanding of the present invention, reference will now be made, by way of example only, to the accompanying drawings in which.

DETAILED DESCRIPTION OF THE INVENTION

In accordance with the present invention, an existing film cassette spool can be modified to have an inner rotatable member which is rotatable between a first position, in which the film strip can be introduced into a slot formed in the spool, and a second position in which the film strip is retained in the slot formed in the spool.

Figure 1:
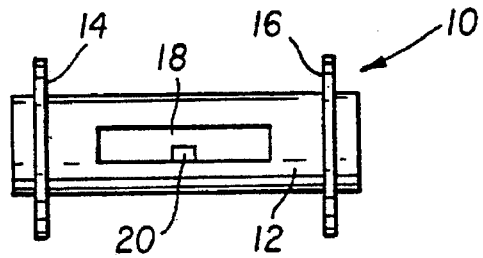
FIG. 1 is a schematic illustration of an existing film cassette spool.

FIG. 1 illustrates an existing film cassette spool 10. The spool 10 comprises a body portion 12 which carries two flange members 14, 16 spaced apart along the body portion a distance to accommodate the width of the film strip to be wound thereon. A slot 18 is formed in the body portion 12 for retaining the trailing end of the film strip (not shown). The slot 18 has a central protrusion 20 for engaging the trailing end of the film strip and preventing its detachment from the spool. Two shoulder portions (not shown) cooperate with the central protrusion to retain the trailing end within the slot.

Figure 2:
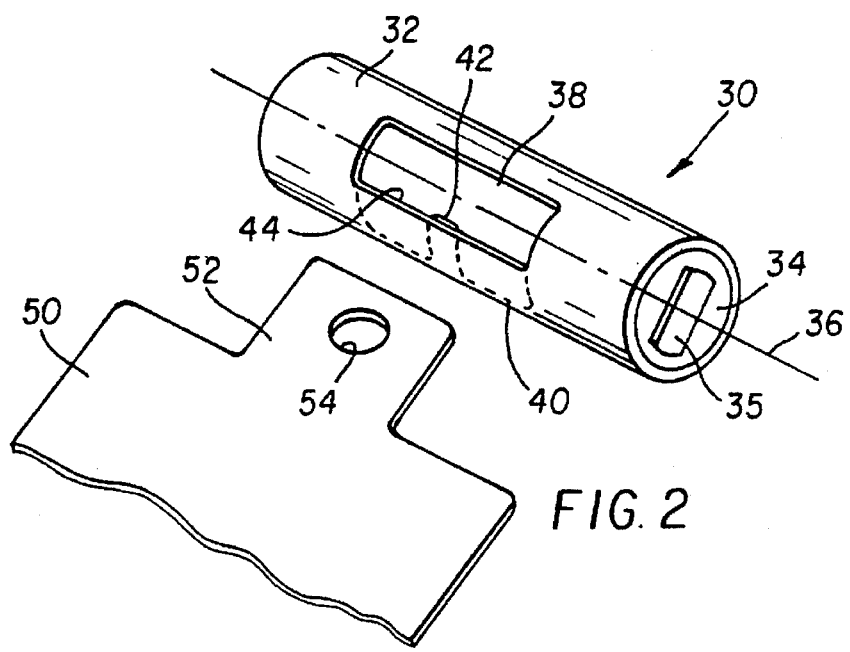
FIG. 2 is a schematic illustration of a cassette spool in accordance with the present invention, the side flanges not being shown for clarity, prior to attachment of the trailing end of a film strip.

FIG. 2 illustrates a film cassette spool 30 in accordance with the present invention. The flange members are not shown for clarity. The spool 30 comprises an outer member 32 and an inner member 34 which is rotatable about the spool axis 36 relative to the outer member 32. Lug 35 on inner member 34 allows it to be rotated about the axis 36 relative to outer member 32.

The outer member 32 has a slot 38 formed in it for retaining a film strip 50. The inner member 34 also has a slot 40 formed in it which corresponds to the slot 38 formed in the outer member 32, slot 40 being larger than slot 38. A centrally disposed tongue portion 42 is provided on inner member 34 which extends partially into the slot 40. (Tongue portion 42 carries out the same function as central protrusion 20 shown in FIG. 1, namely, to engage an aperture in a film strip.) As slot 38 is smaller than slot 40, when the inner member 34 is in a first position, only a portion of slot 40 coincides with slot 38 (as shown) and the tongue portion 42 is substantially aligned with edge 44 of slot 38.

An existing film strip 50 is shown in FIG. 2 which has a trailing end 52 in which an aperture 54 is formed. Aperture 54 is used to attach the trailing end 52 to the central protrusion 20 of an existing film cassette spool 10 as shown in FIG. 1. The aperture 54 is also used to attach the trailing end 52 of the film strip 50 to the cassette spool 30 in accordance with the present invention.

Figure 3:
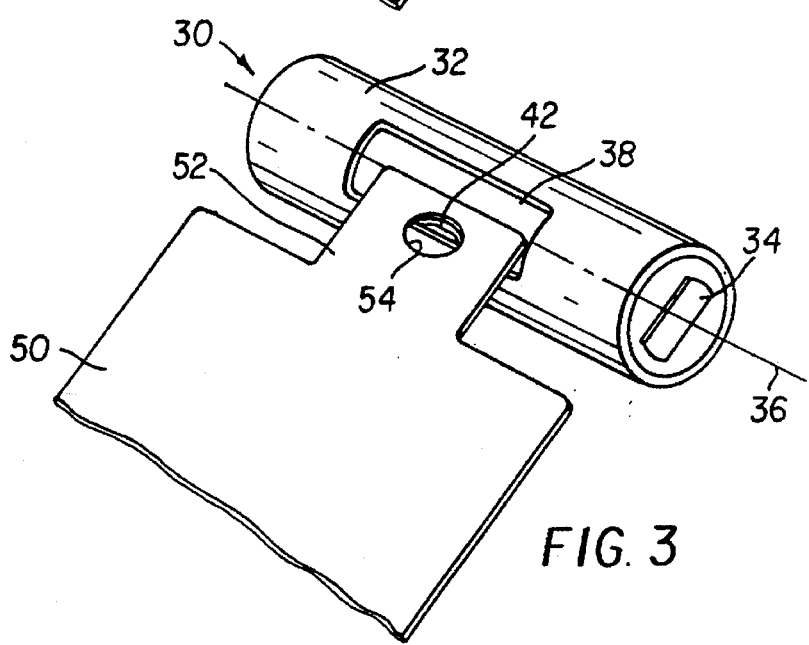
FIG. 3 is similar to FIG. 2 but illustrates the introduction of the trailing end of the film strip into the cassette spool.

FIG. 3 illustrates the trailing end 52 of the film strip 50 being inserted into slots 38, 40 of outer member 32 and inner member 34 respectively—slot 40 being aligned with slot 38 and tongue portion 42 aligned with edge 44 as described above with reference to FIG. 2.

Figure 4:
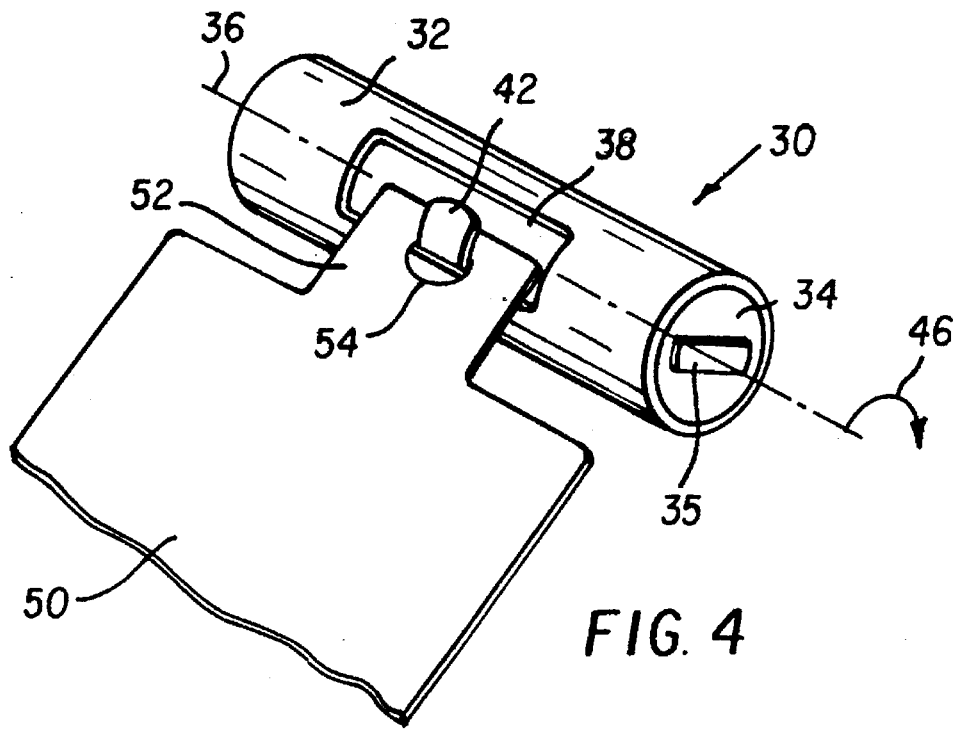
FIG. 4 is similar to FIG. 3 and illustrates the operation of the attachment means which maintains the attachment of the film strip to the cassette spool.

As the inner member 34 is rotated about axis 36 by means of lug 35, in the direction indicated by arrow 46 as shown in FIG. 4, tongue portion 42 moves into slot 38 of outer member 32 to engage aperture 54 in the trailing end 52.

Figure 5:
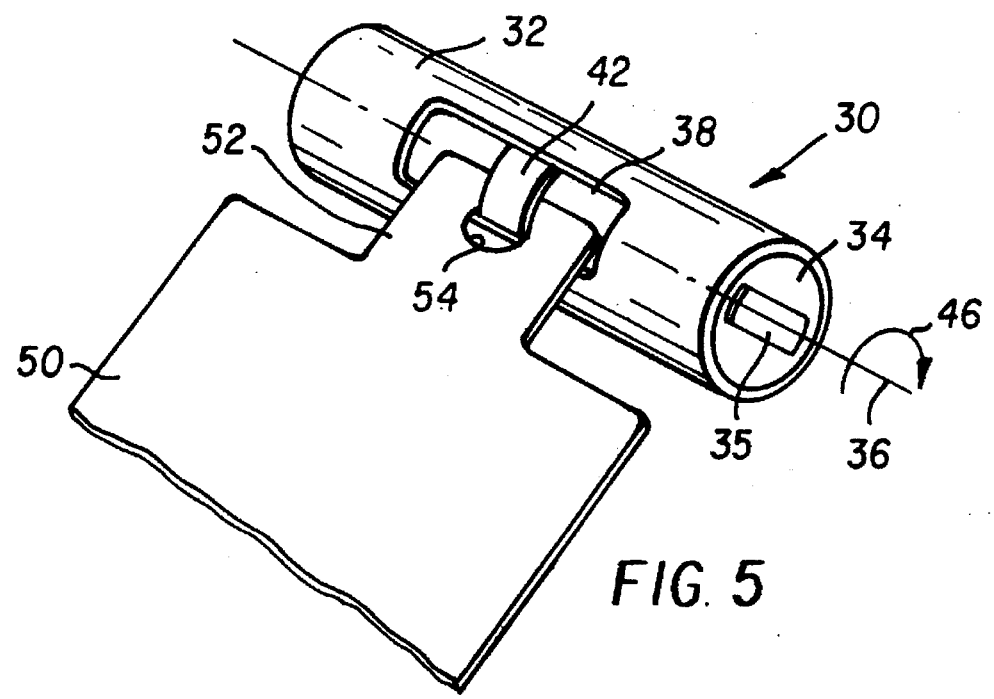
FIG. 5 is similar to FIG. 4, and shows the film strip attached to the cassette spool.

Further rotation in the direction of arrow 46, FIG. 5, causes tongue portion 42 to pass completely through slot 38 in outer member 32 thereby attaching the trailing end 52 of the film strip 50 to the spool 30.

When it is desired to release the film strip 50 from the spool 30, inner member 34 is rotated about axis 36 in the direction opposite to that indicated by arrow 46 until tongue portion 42 is once more aligned with edge 44 of slot 38 as shown in FIG. 2. The film strip 50 is then released and can be detached from the spool 30.

Although the trailing end 52 of the film strip 50 has been described as having a single aperture 54, more than one aperture may be provided.

Similarly, inner member 34 may have more than one tongue portion for engaging more than one aperture if desired.

We claim:

1. A film cassette spool comprising:

a body portion having a first slot formed therein for receiving a film strip; and attachment means located in the first slot for attaching the film strip to the spool;

characterized in that the body portion includes an inner body portion carrying the attachment means, the inner body portion being rotatable relative to the body portion between a first position in which the attachment means is not in engagement with the film strip and a second position in which the attachment means engages the film strip, and wherein the attachment means comprises a tongue portion which extends across the slot when said body portion is in the second position, said tongue portion being formed at an edge of a second slot formed in the inner body portion, said second slot being substantially larger than said first slot formed in the body portion.

2. A film cassette spool according to claim 1, wherein the inner body portion carries a lug member by which it is rotated relative to the body portion.

3. A method of releasably attaching a film strip to a film cassette spool having a spool axis and comprising: a body portion having a first slot formed therein for receiving a film strip, an inner body portion located inside the body portion and which is rotatable relative thereto between a first position and a second position, and an attachment means located in the first slot for attaching the film strip to the spool, the attachment means comprising a tongue portion carried by the inner body portion, said tongue portion being formed at an edge of a second slot formed in the inner body portion, and wherein said second slot being substantially larger than said first slot formed in said body portion, characterized in that the method comprises the steps of:

a) inserting the film strip into the first slot formed in the body portion of the cassette spool;

b) rotating the inner body portion relative to the body portion so that the tongue portion engages the film strip; and c) reversing the direction of rotation of the inner body portion relative to the body portion to release the film strip.

\* \* \* \* \*